(12) United States Patent
Carnevali

(10) Patent No.: US 7,762,512 B2
(45) Date of Patent: Jul. 27, 2010

(54) SELF LEVELING ADAPTOR

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 842 days.

(21) Appl. No.: 11/087,184

(22) Filed: Mar. 22, 2005

(65) Prior Publication Data

US 2006/0239766 A1    Oct. 26, 2006

(51) Int. Cl.
*A47B 91/00* (2006.01)
(52) U.S. Cl. ............... 248/346.01; 248/176.1; 248/309.1
(58) Field of Classification Search ............. 248/205.5, 248/176.1, 177.1, 205.1, 220.21, 126, 309.1; 403/79
See application file for complete search history.

(56) References Cited

U.S. PATENT DOCUMENTS

| | | | | |
|---|---|---|---|---|
| 2,364,165 A * | 12/1944 | Sarnes | .................. | 248/475.1 |
| 2,775,919 A * | 1/1957 | Fischer | .................. | 248/479 |
| 2,808,908 A | 10/1957 | Lyon | | |
| 3,436,049 A * | 4/1969 | Claire et al. | ............... | 248/479 |
| 3,492,769 A * | 2/1970 | Olson | ..................... | 52/110 |
| 3,599,926 A * | 8/1971 | Takahashi | ............... | 248/549 |
| 3,759,576 A * | 9/1973 | Richter | .............. | 301/35.629 |
| 4,066,235 A * | 1/1978 | Hashiguchi | ............. | 248/482 |
| 4,082,243 A * | 4/1978 | Watt et al. | .............. | 248/205.1 |
| 4,441,681 A * | 4/1984 | Oda et al. | ............... | 248/475.1 |
| 5,016,850 A * | 5/1991 | Plahn | .................. | 248/206.3 |
| 5,020,754 A * | 6/1991 | Davis et al. | ............. | 248/206.3 |
| 5,058,846 A * | 10/1991 | Close | ................... | 248/284.1 |
| 5,790,661 A * | 8/1998 | Patterson | ................. | 379/446 |
| 5,820,093 A * | 10/1998 | Murray | .................. | 248/274.1 |
| 5,911,395 A * | 6/1999 | Hussaini | ................ | 248/206.3 |
| 6,010,102 A * | 1/2000 | Dillion, Jr. | .............. | 248/206.3 |
| 6,215,624 B1 * | 4/2001 | Summers et al. | .......... | 360/244.5 |
| 6,219,931 B1 * | 4/2001 | Roth | ......................... | 33/645 |
| 6,406,067 B1 * | 6/2002 | Pritchatt | .................... | 285/197 |
| 6,447,332 B1 * | 9/2002 | Djian | ....................... | 439/564 |
| 6,462,279 B1 * | 10/2002 | Serizawa et al. | ......... | 174/72 A |
| 6,642,814 B2 * | 11/2003 | Lamont et al. | ............ | 333/202 |
| 6,779,765 B2 * | 8/2004 | Zheng et al. | ............ | 248/206.3 |
| 7,059,614 B2 * | 6/2006 | Cole, III | .................. | 280/14.24 |
| 2001/0047913 A1 | 12/2001 | Conti et al. | | |
| 2002/0050181 A1 | 5/2002 | Kaji | | |
| 2004/0258460 A1 | 12/2004 | Taylor | | |
| 2005/0205724 A1 * | 9/2005 | Carnevali | ................ | 248/122.1 |

* cited by examiner

*Primary Examiner*—Kimberly T Wood
(74) *Attorney, Agent, or Firm*—Charles J. Rupnick, Attorney at Law

(57) ABSTRACT

A self leveling adaptor that forms a substantially level and planar mounting surface on a curved or otherwise irregular external surface for mounting of an external device having a substantially planar mounting base. The self leveling adaptor of the invention includes a rigid plate having a substantially planar mounting surface and a pliable boot thereabout that is structured to substantially conform to the curved or otherwise irregular external surface. Three nipples between the rigid plate and the external surface cause the rigid plate to be firmly seated against the external surface without rocking.

17 Claims, 7 Drawing Sheets

SELF LEVELING ADAPTOR

FIELD OF THE INVENTION

The present invention relates to a self leveling adaptor for converting a curved or irregular surface to a substantially planar surface, and in particular to a self leveling adaptor having a plurality of support nipples and a pliable boot projected from one surface of a mounting plate.

BACKGROUND OF THE INVENTION

It is generally well known that many vehicle surfaces are curved, rounded or otherwise irregular so that mounting any device having a flat mounting surface is challenging, both structurally and cosmetically.

SUMMARY OF THE INVENTION

The present invention overcomes the structural and cosmetic mounting limitations of the prior art by providing a self leveling adaptor that forms a substantially level and planar mounting surface on a curved or otherwise irregular external surface for mounting of an external device having a substantially planar mounting base such as, by example and without limitation, a coupler of the type described in U.S. Pat. No. 5,845,885 entitled "Universally Positionable Mounting Device," issued to Jeffrey D. Carnevali on Dec. 8, 1998, which is incorporated by reference herein in its entirety. The self leveling adaptor of the invention includes a rigid plate having a substantially planar mounting surface and a pliable boot thereabout that is structured to substantially conform to the curved or otherwise irregular external surface.

According to one aspect of the invention, the rigid plate is structured with opposing and separate substantially planar mounting and coupling surfaces and is formed with one or more fastening holes there through with the pliable boot thereabout. According to at least one embodiment of the invention, the rigid plate includes one or more fastening holes there through each having a surrounding support nipple protruding outwardly from the coupling surface, each support nipple having a contact surface at a distal end thereof. Three of the support nipples for contacting the curved or otherwise irregular external surface cause the plate to seat securely against the external surface and further cause the plate to self-level relative to the external surface. The plate thus forms a self leveling adaptor for mounting of another flat bottomed device against the curved or otherwise irregular external surface. The pliable boot is formed, by example and without limitation, having a substantially hollow corrugated skirt and is mated to the coupling surface of the rigid plate with a waist portion of the skirt being formed around a peripheral lip portion of the plate. The skirt is optionally flared or straight. The pliability of the boot permits the skirt to flow smoothly around the self leveling adaptor between the plate and the external surface, even when the external surface is curved or otherwise irregular in contour.

According to one aspect of the invention, the boot portion of the self leveling adaptor of the invention is a substantially hollow cup formed from a resiliently flexible or pliable material. The pliable boot is formed to fit around a substantial portion of the peripheral lip of the plate and is coupled thereto through the waist portion. The skirt portion of the boot is formed with an outer facing surface which includes the skirt waist and extends to a distal skirt hem portion thereof. The skirt hem forms a border or distal edge of the skirt which makes substantially direct contact with the curved or irregular external surface to which the self leveling adaptor is attached. The skirt portion is, by example and without limitation, configured having one or more substantially cosmetic cords or "hoops" formed of the resiliently flexible or pliable material.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
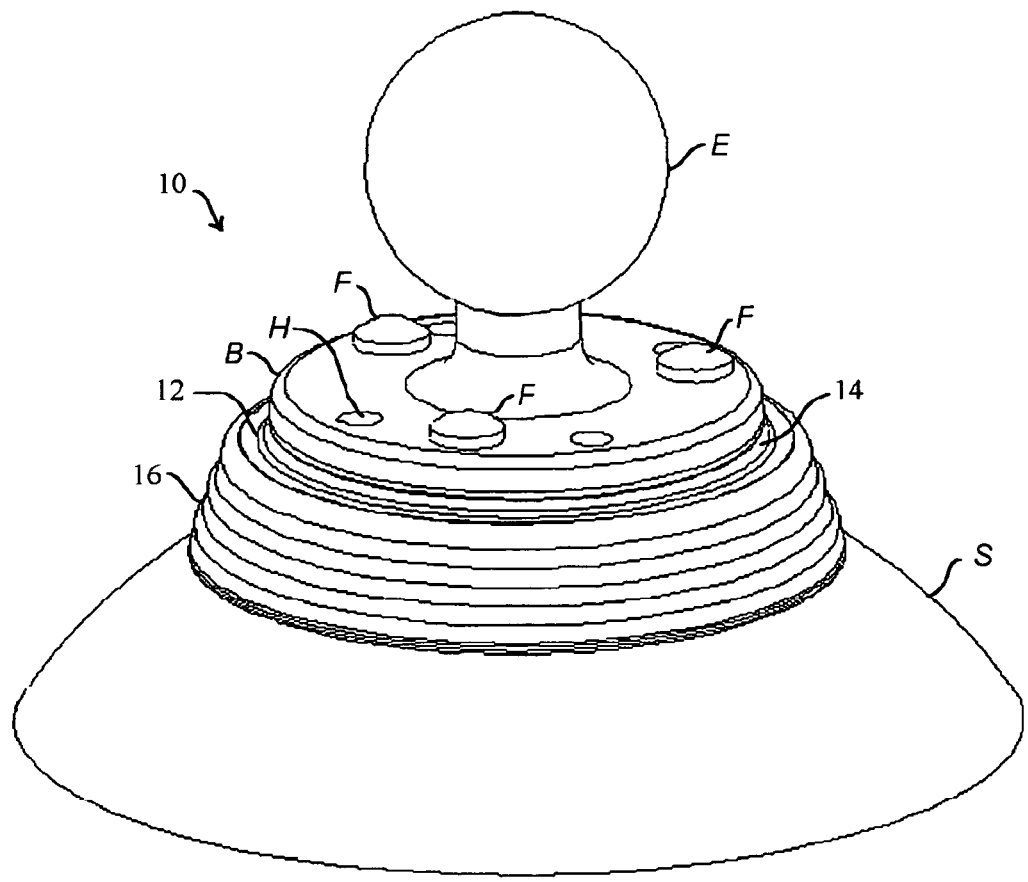
FIG. 1 is a perspective view of a self leveling adaptor of the invention.

FIG. 1 is a perspective view of a self leveling adaptor 10 that creates a substantially level and planar mounting surface on a curved or otherwise irregular external surface S for mounting of an external device E having a substantially planar mounting base B and a quantity of holes H each structured to accommodate a fastener F. The external device E is, by example and without limitation, a coupler of the type described in U.S. Pat. No. 5,845,885 entitled "Universally Positionable Mounting Device," issued to Jeffrey D. Carnevali on Dec. 8, 1998, which is incorporated by reference herein in its entirety. The self leveling adaptor 10 of the invention includes a rigid plate 12 having a substantially planar mounting surface 14 and a pliable boot 16 thereabout that is structured to substantially conform to the curved or otherwise irregular external surface S.

Figure 2:
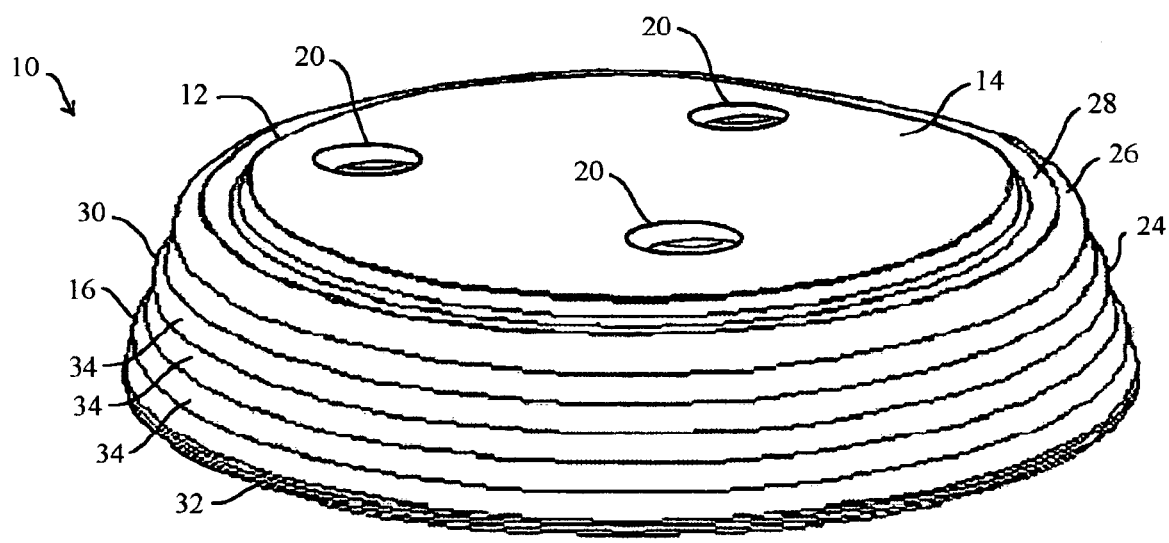
FIG. 2 is a top perspective view that illustrates one embodiment an apparatus and method of the invention for a self leveling adaptor of the invention.

FIG. 2 is a top perspective view that illustrates one embodiment an apparatus and method of the invention for a self leveling adaptor 10 of the invention having the rigid plate 12 that is structured with opposing and separate substantially planar mounting and coupling surfaces 14, 18 (shown in subsequent figures) and is formed with one or more fastening holes there through with the pliable boot 16 thereabout. According to at least one embodiment of the invention, the rigid plate 12 includes one or more fastening holes 20 there through each having a surrounding support nipple 22 (shown in subsequent figures) protruding outwardly from the coupling surface 18, each support nipple 22 having a contact surface 23 at a distal end thereof. Three of the support nipples 22 for contacting the curved or otherwise irregular external surface S cause the plate 12 to seat securely against the external surface S and further cause the plate 12 to self-level relative to the external surface S. The plate 12 thus forms a self leveling adaptor for mounting of another flat bottomed device against the curved or otherwise irregular external surface S. The pliable boot 16 is formed, by example and without limitation, having a substantially hollow corrugated skirt 24 and is mated to the coupling surface 18 of the rigid plate 12 with a waist portion 26 of the skirt 24 being formed around a peripheral lip portion 28 of the plate 12. The skirt 24 is optionally flared, as shown, or straight. The pliability of the boot 16 permits the skirt 24 to flow smoothly around the self leveling adaptor 10 between the plate 12 and the external surface S, even when the external surface S is curved or otherwise irregular in contour.

As embodied in FIG. 2 and shown in subsequent figures, the boot 16 portion of the self leveling adaptor 10 of the invention is a substantially hollow cup formed from a resiliently flexible or pliable material. The pliable boot 16 is formed to fit around a substantial portion of the peripheral lip 28 of the plate 12 and is coupled thereto through the waist portion 26. The skirt portion 24 of the boot 16 is formed with an outer facing surface 30 which includes the skirt waist 26 and extends to a distal skirt hem 32 portion thereof. The skirt hem 32 forms a border or distal edge of the skirt 24 which makes substantially direct contact with the curved or irregular external surface S to which the self leveling adaptor 10 is attached. The skirt portion 24 is, by example and without limitation, configured having one or more substantially cosmetic cords or "hoops" 34 formed of the resiliently flexible or pliable material.

Figure 3:
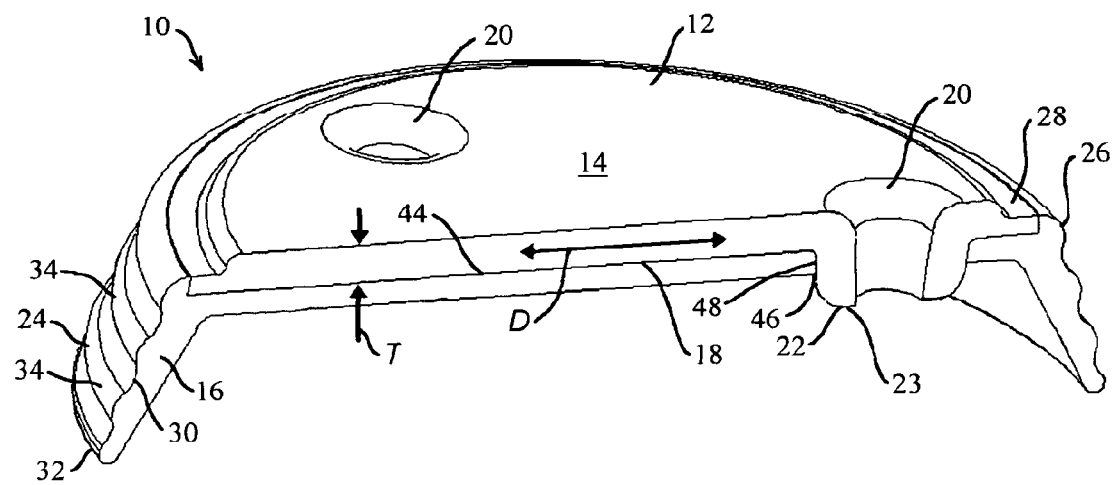
FIG. 3 is a perspective cross-section view of a self leveling adaptor of the invention.
Figure 4:
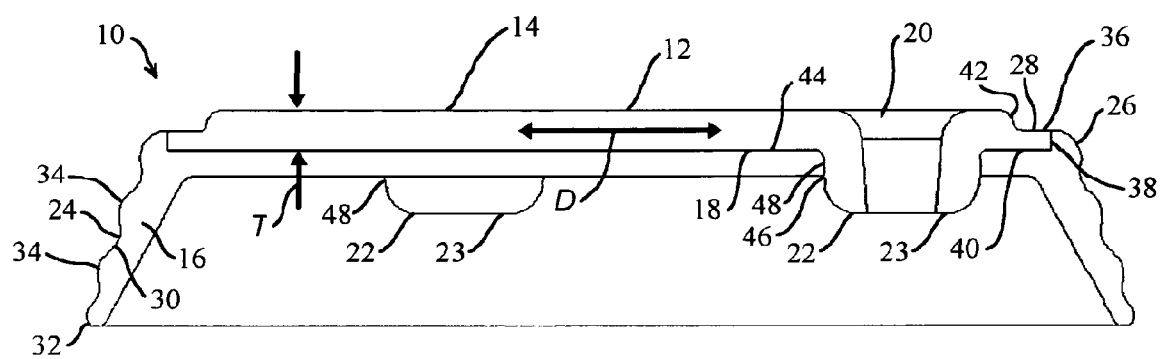
FIG. 4 is a side cross-section view of a self leveling adaptor of the invention.

FIG. 3 and FIG. 4 both illustrate the plate 12 as including the substantially planar coupling surface 18 opposite from the plate mounting surface 14 which is surrounded at its circumference or outer edge by the integral peripheral lip 28. The plate 12 also includes one or more of the integral support nipples 22 each encompassed on the underside coupling surface 18 of the plate 12 by one of the support nipples 22.

The plate portion 12 of the self leveling adaptor 10 is formed, by example and without limitation, as a generally circular, substantially planar object having an outer diameter D that is approximately, but not limited to, more or less about 1 inch and having a thickness T which supports an external load applied to its mounting surface 14. The plate portion 12 of the self leveling adaptor 10 is formed of a substantially rigid material such as but not limited to a metal, plastic, composite or another substantially rigid material capable of supporting external objects mounted thereon. The plate portion 12 has the one or more fastening holes 20 formed there through, with each fastening hole 20 having a surrounding nipple 22 formed integral with the coupling surface 18 and protruding outwardly therefrom. Each fastening hole 20 is structured to accept one of the fastening devices F there through for securing the self leveling adaptor 10 of the invention to the external surface S with an external device E applied to its mounting surface 14. According to at least one embodiment of the invention, the fastening holes 20 are circular in form and structured to accept a standard or non-standard fastening device such as a screw, bolt, pin, stud, clasp, rivet or other fastener.

According to at least one embodiment of the invention, one or more of the nipples 22 protrudes from the coupling surface 18 of the plate 12 and forms a contact point between the plate 12 and the curved or irregular surface S to which the self leveling adaptor 10 of the invention is attached, with three of the support nipples 22 forming a plane on substantially any curved or irregular surface S.

According to one embodiment of the invention, three fastening holes 20 and three corresponding support nipples 22 are distributed in any triangular pattern for providing the three contact points that form a plane on substantially any curved or irregular surface S.

According to one embodiment of the invention, the fastening holes 20 and corresponding support nipples 22 are uniformly spaced in a substantially equilateral triangle such that the fastening holes 20 and corresponding support nipples 22 form a substantially circular pattern with the nipple contact surfaces 23 forming a substantially flat plane that is substantially parallel with the plate mounting and coupling surfaces 14, 18.

As embodied in FIGS. 3 and 4, the nipples 22 are substantially tubular in form with the fastening holes 20 forming central canals there through, the fastening holes 20 being structured to accept any selected standard or non-standard fastening device such as a screw, bolt, pin, stud, clasp, rivet or other fastener.

As illustrated by the embodiment of FIGS. 3 and 4, the peripheral lip 28 of the plate 12 is formed to seat coplanar or flush to the waist portion 26 of the boot 16 and is structured to be sufficiently rigid to prevent the boot 16 from excessive movement or excessive or non-elastic lateral or radial bending or other deformation. As embodied in FIGS. 3 and 4, the cross section of the peripheral lip 28 of the plate 12 is, by example and without limitation, substantially rectangular in shape and for illustrative purposes, includes a peripheral lip crown 36, rim 38, and seat 40. The crown 36 forms a top surface of the peripheral lip 28 of the plate 12 and is coincident with the mounting surface 14 of the plate 12. The crown 36 forms a smooth transition 42 to the mounting surface 14 of the plate 12, the transition 42 is for example a chamfer or radius (shown). The description of the transition from the peripheral lip 28 to the mounting surface 14 of the plate 12 as a rounded chamfer in no way limits the possible equivalent forms which this transition 42 may be practiced.

The rim 38 forms an outer radial border or extremity of the peripheral lip 28 of the plate 12. The seat 40 forms a bottom or under surface of the peripheral lip 28 of the plate 12 and is substantially coincident with the coupling surface 18 of the plate 12.

To aid in the description of the invention, the plate portion 12 has been described in terms of a mounting surface 14 and a coupling surface 18. These terms are intended as merely descriptive and are not intended to limit the scope of the invention in any way. The mounting surface 14 is generally described as the top or outer side of the plate 12 where the device E or other attachment may be placed. The coupling surface 18 is generally described as the under side of the plate 12 where the invention is to be attached or mated to the external curved or irregular surface S.

As embodied in FIGS. 3 and 4, the plate 12 and boot 16 portions are structured as wholly separate and discrete units that together form the self leveling adaptor 10 when the boot 16 is assembled to the plate 12. Alternatively, an interior base portion 44 of the cup-shaped boot 16 contacts the coupling surface 18 of the plate 12 and is optionally vulcanized or otherwise adhered to the coupling surface 18 of the plate 12. Additionally, nipple apertures 46 surround the protrusion of the nipples 22 and are optionally adhered thereto. Simultaneously, the waist portion 26 of the boot 16 is structured to fit around all or at least a substantial portion of the peripheral lip portion 28 of the plate 12. According to different embodiments of the invention, the waist portion 26 of the boot 16 contacts any one or more of the crown 36, the rim 38 and the seat 40 of the plate peripheral lip 28.

Figure 5:
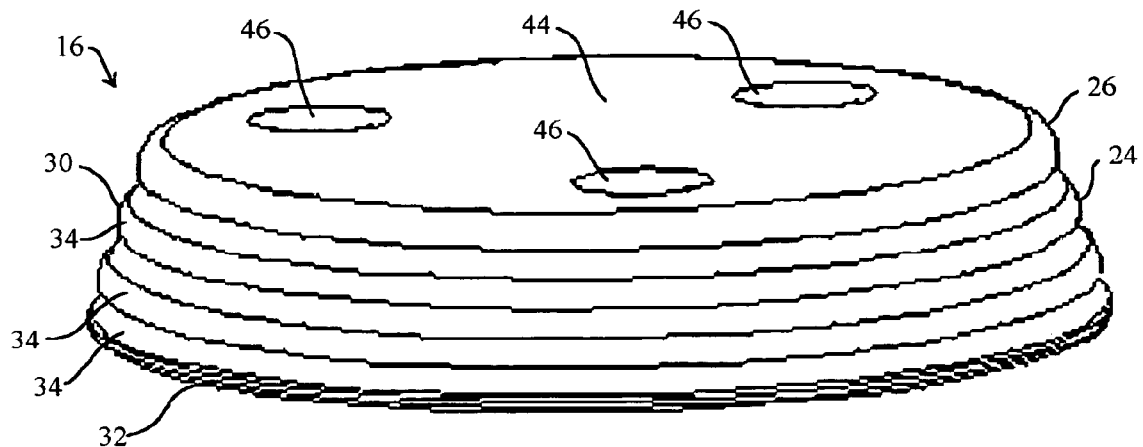
FIG. 5 is a top perspective view that illustrates one embodiment of a boot portion of the self leveling adaptor of the invention.

FIG. 5 illustrates the boot 16 portion of the invention as being formed of a resiliently pliable material. The boot 16 is formed with the outer surface 30 of the skirt 24 having one or more of the hoops 34 surrounding the interior base portion 44 of the cup-shaped boot 16. As illustrated, the interior base portion 44 of the cup-shaped boot 16 is formed as an integral substantially planar "sheet" portion that is coupled to the skirt 24 through the integral waist 26 portion. The boot interior base portion 44 is formed around each of the protruding nipples 22 of the plate 12 and is structured to contact the coupling surface 18 thereof. The pliable boot 16 is injection molded or otherwise formed of a resiliently flexible or pliable material such as, but not limited to, a resiliently flexible or pliable plastic, a rubber or elastomer, a composite or another resiliently flexible or pliable material capable of forming resiliently compressible boots of the type described here. According to at least one embodiment of the invention, the skirt 24 of the boot 16 is structured to engage and maintain substantial contact at the curved or irregular external surface S to which the self leveling adaptor 10 of the invention is attached when the plate 12 is coupled to the external surface S and the boot 16 is compressed under load provided by the one or more fastening devices through the fastening holes 20 such that the nipples 22 are secured in substantially permanent contact with the external surface S. Nipple apertures 46 are formed through the interior base portion 44 the cup-shaped boot 16 for each of the fastening hole nipples 22 of the plate 12. The nipple apertures 46 may be realized by cutting, or may be formed during an injection mold process, whereby the boot 16 is formed.

Optionally, the interior base portion 44 of the boot 16 is vulcanized or otherwise substantially permanently adhered to the plate coupling surface 18, and the skirt apertures 46 are vulcanized or otherwise adhered to an outer surface 48 of each nipple 22 (shown in previous and subsequent figures). Alternatively, the nipple apertures 46 are pre-cut to fit around the nipple outer surface 48 prior to mating of the boot 16 to the coupling surface 18 of the plate 12, the nipple apertures 46 being cut using any form of machine cutting of resiliently compressible materials such as, but not limited to, a water jet cutting system.

Alternative Embodiments

Figures 6, 7:
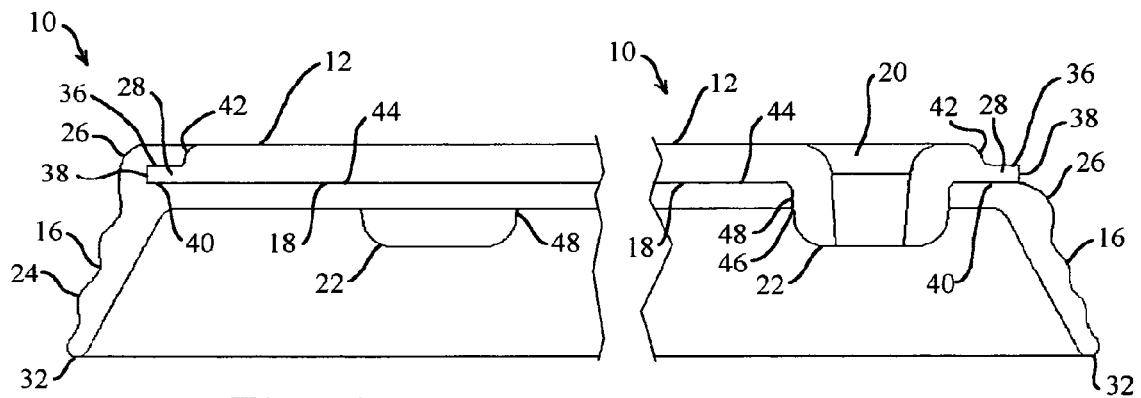
FIGS. 6-15 are side cross-section partial views of different alternative embodiments of the self leveling adaptor of the invention.

FIG. 6 illustrates an alternative embodiment of the invention wherein the skirt waist 26 is formed as an over-mold to the peripheral lip 28 of the plate 12. The over-mold of the boot 16 is substantially accomplished in the waist 26 portion of the skirt 24. The over-mold of the boot 16 to the peripheral lip 28 of the plate 12 results in a substantially coplanar, or flush, interface between the waist 26 of the boot 16 and the mounting surface 14 of the plate 12. The over-molded waist portion 26 of the boot 16 completely encompasses the seat 40 and rim 38 of the peripheral lip 28 of the plate 12. The over-molded waist portion 26 of the boot 16 also completely covers the crown portion 36 of the peripheral lip 28 up to and including the transition 42 from the peripheral lip 28 to the mounting surface 14 of the plate 12. The formation of the over-molded waist portion 26 is accomplished, by example and without limitation, by injection molding of the boot 16, and adhesion of the over-molded waist portion 26 to the peripheral lip 28 of the plate 12 is accomplished, by example and without limitation, using vulcanization or any other method where a resiliently flexible or pliable material may be molded to envelope and adhere to a rigid, angular surface as described here.

FIG. 7 illustrates another alternative embodiment wherein the interface of the over-molded waist portion 26 of the boot 16 is formed to seat substantially beneath the peripheral lip 28 of the plate 12 and adhered to the peripheral lip seat 40. In this embodiment, the skirt waist 26 is substantially coincident with the interior base portion 44 of the boot 16. The boot 16 and plate 12 portions are optionally wholly separate and independent units. However, according to one embodiment of the invention, the boot interior base portion 44 and waist 26 are optionally integrally formed, as by injection molding as a single unit, and vulcanized or otherwise substantially permanently adhered to the coupling surface 18 of the plate 12. Additionally, the nipple apertures 46 are optionally adhered to the protrusion of the fastening hole nipples 22 at the nipple outer surface 48.

Figures 8, 9:
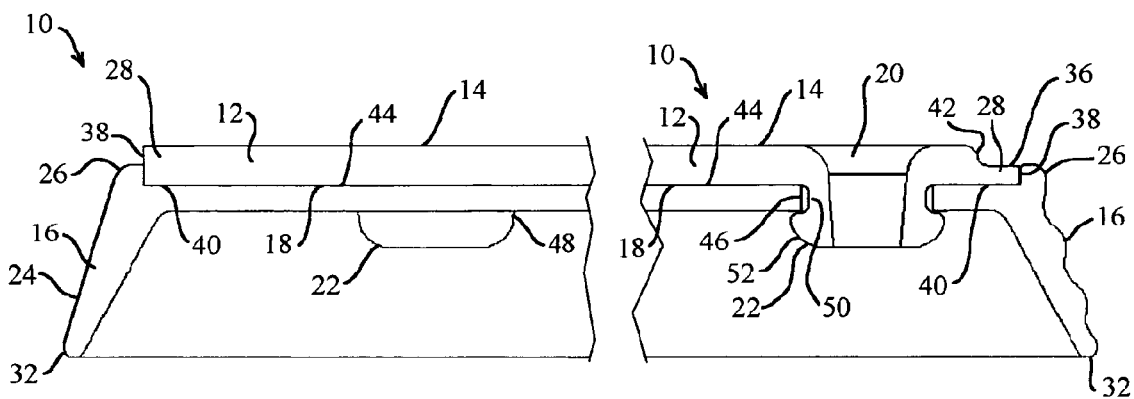

FIG. 8 illustrates another alternative embodiment of the boot 16 wherein the skirt outer surface 30 is formed with a smooth or non-corrugated surface which smoothly transitions from the skirt waist 26 to the skirt hem 32 with a tapering thickness. Also illustrated is the peripheral lip 28 of the plate 12 being configured having a substantially rectangular structure that eliminates both the crown portion 36 and the transition 42 to the mounting surface 14. The structure of the peripheral lip 28 in cross section is thus, by example and without limitation, substantially rectangular, right-angled, semi-circular or another combination of forms. These terms are merely descriptive and are not intended to limit the scope of the invention in any way.

FIG. 9 illustrates another alternative embodiment wherein the fastening hole nipple 22 is formed having a necked-down stalk or re-entry area 50 between the coupling surface 18 of the plate 12 and a button-shaped nipple end cap 52, whereby the nipple 22 is configured having a "mushroom" shape. The nipple apertures 46 are more or less concurrent in dimension with the re-entry area 50 of the nipple 22 and are formed to fit snugly over the nipple end caps 52 and reside in the re-entry area 50 adjacent to the coupling surface 18 when the boot 16 is fully mated to the plate 12. When the plate 12 and boot 16 portions are embodied as wholly separate units, the nipple apertures 46 are formed to fit snugly enough within the re-entry areas 50 to prevent the plate 12 and boot 16 detaching from one another.

Figures 10, 11:
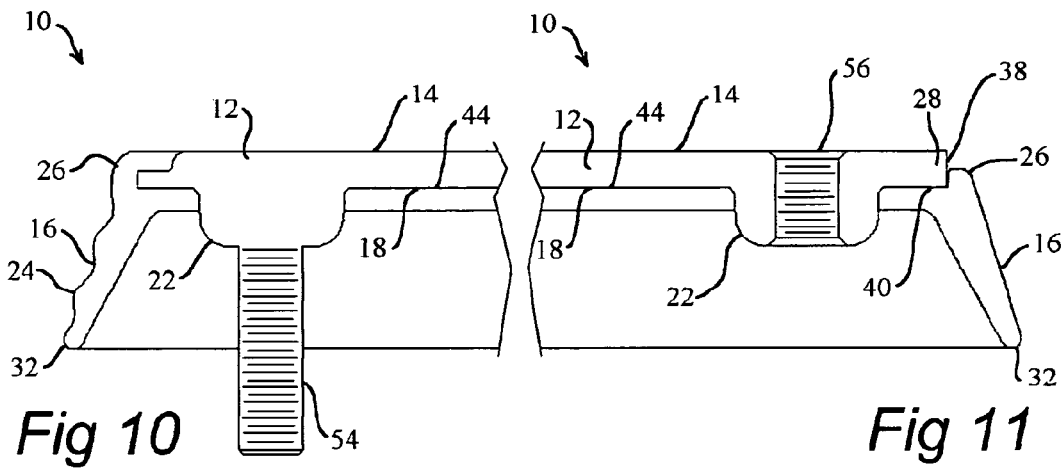

FIG. 10 illustrates another alternative embodiment wherein the fastening holes 20 through the plate 12 are eliminated. Rather, each nipple 22 is formed with an integral threaded stud 54. The plate 12, nipples 22, and integral threaded studs 54 are formed of a substantially rigid material capable of supporting objects.

According to another embodiment of the invention, the plate 12, nipples 22 and threaded studs 54 are optionally configured as wholly separate and non-integral units. When the plate 12, nipples 22 and threaded studs 54 are configured as wholly separate non-integral units, those separate parts are optionally formed of different materials. The stud 54 attachment structure is not limited to a threaded interface, but is optionally configured as a tapered screw threaded with any standard or non-standard thread pitch. Alternatively, the stud 54 is formed with a crosswise hole to accept a set pin or cotter key, or is structured to receive another conventional retaining device, such as a snap ring.

FIG. 11 illustrates another alternative embodiment wherein the plate fastening holes 20 are replaced by internally threaded fastening holes 56 that are formed in the nipples 22 and are structured to receive a screw, bolt, stud or other standard or non-standard threaded fastening device. The internally threaded fastening holes 56 are not limited to a through hole configuration, but are optionally configured as blind threaded holes where the threaded fastening holes 56 are open to and accessed from the mounting surface 14 side of the plate 12 and are enclosed entirely within the nipple 22 and bottom therein. Alternatively, the blind threaded fastening holes 56 are optionally open to and accessed from the coupling surface 18 side of the plate 12 at the nipple cap 52 and are entirely enclosed within the nipple 22 and inaccessible from the mounting surface 14 side of the plate 12. Commensurate with this embodiment of the leveling adaptor 10 having the internally threaded fastening holes 56, the plate 12 thickness is optionally increased to provide added strength when the plate 12 portion itself is thus the primary attachment mechanism. The plate 12 thickness and nipple 22 structures are optionally increased or decreased to accommodate any alternate configurations of the invention. In the alternate embodiment of FIG. 7 (right side), the internally threaded fastening holes 56 are formed entirely within the plate 12. However, the internally threaded fastening holes 56 are optionally realized with the use of a separate threaded insert embedded in each of the fastening holes 20. The separate threaded insert are conventional commercially available devices formed of any material such as, but not limited to, a hardened steel. When the internally threaded fastening holes 56 are realized using a threaded insert, it is understood that the structure of the plate 12 required to accommodate such a device is fully included within the spirit and scope of the invention.

Figures 12, 13:
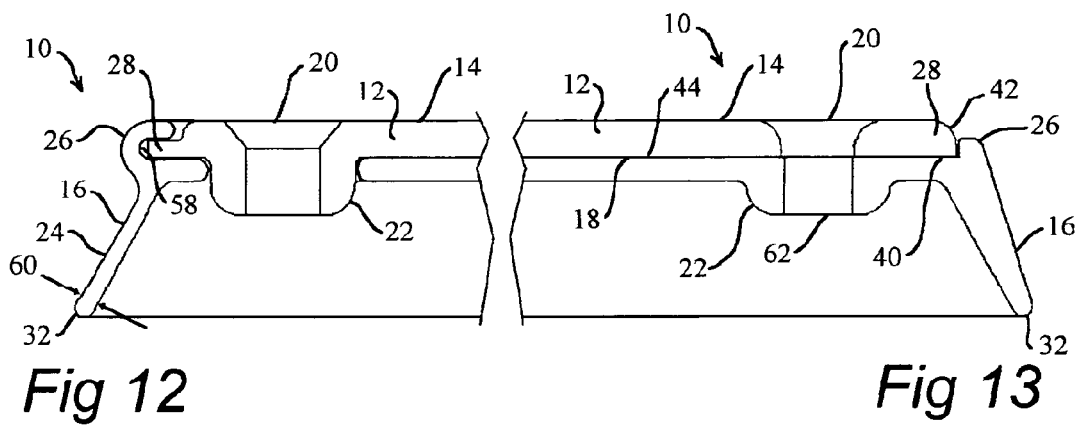

FIG. 12 illustrates another alternative embodiment wherein the boot 16 and plate 12 are wholly separate units and the skirt waist 26 is formed having a radial groove or channel 58 that is structured to fit around and couple to a substantial portion of the peripheral lip 28 of the plate 12. Also illustrated is the fastening holes 20 optionally being a non-tapered hole through the plate 12 that is optionally counter-sunk at the mounting surface 14. Also illustrated is another alternative embodiment of the boot skirt 24 having the optionally smooth and non-corrugated outer surface 30 formed with a substantially constant thickness 60.

FIG. 13 illustrates another alternative form of the boot 16 and plate 12 portions of the leveling adaptor 10 wherein the support nipple 22 and the skirt interior base portion 44 are integrally formed within the cup-shaped boot 16. Accordingly, the boot 16 portion is formed of a resiliently flexible or pliable material such as, but not limited to, a resiliently flexible or pliable plastic, a rubber or elastomer, a composite or another resiliently flexible or pliable material capable of forming resiliently compressible skirts of the type described here. The integral pliable support nipples 22 of the boot 16 are each formed with an aperture 62 through the skirt interior base portion 44 that is aligned with corresponding fastening holes 20 through the plate 12. The integral pliable support nipples 22 of the boot 16 each contact the curved or otherwise irregular external surface S and thus cause the plate 12 to seat securely against the external surface S and further cause the plate 12 to self-level relative to the external surface S. The boot 16 thus forms the self leveling adaptor for mounting of another flat bottomed device E against the curved or otherwise irregular external surface S.

Figures 14, 15:
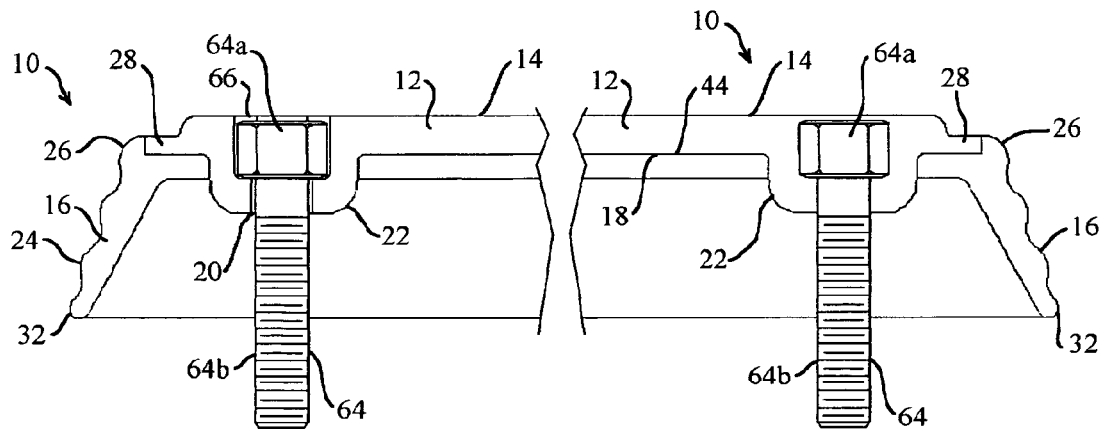

FIG. 14 illustrates another alternative embodiment of the plate 12 wherein the fastening holes 20 and surrounding nipples 22 are structured to accept a discrete fastener 64. According to at least one embodiment of the invention, by example and without limitation, the fastening holes 20 include a recessed portion 66, such as a countersink or counter bore (shown), that is aligned with and optionally formed into the corresponding support nipple 22 for accommodating and retaining the discrete fastener 64. For example, for a discrete fastener 64 having a hexagonally shaped bolt head 64a and corresponding threaded shaft 64b, the counter bore portion 66 of the fastening holes 20 is formed having a recessed hexagonal shape that is structured to prevent the hexagonally shaped bolt head 64a from rotating freely. The discrete fastener 64 is embodied as a hexagonally shaped fastener only for illustrative purposes and is not intended to limit the scope of the invention in any way. The counter bore portions 66 of the fastening holes 20 are optionally structured to fully envelope the bolt head 64a of the discrete fastener 64, which is optionally fully recessed within the fastening holes 20. Alternatively, the bolt head 64a of the discrete fastener 64 protrudes from the fastening hole above the plate mounting surface 14. Additionally, the bolt head 64a of the discrete fastener 64 is optionally inserted into and rotationally secured within the counter bore 66 using other structures, such as a press fit or adhesive, without limiting the scope of the invention in any way.

FIG. 15 illustrates another alternative embodiment of the plate 12 wherein the discrete fastener 64 is embedded in the fastening holes nipples 22 and molded entirely within the plate 12 structure. Accordingly, the fastening holes 20 and corresponding support nipples 22 are molded over the discrete fastener 64. According to at least one embodiment of the invention, the hexagonally shaped bolt head 64a and corresponding bolt shaft 64b are molded entirely within the plate 12 and nipple 22 structures. The discrete fastener 64 is embodied as a hexagonally shaped fastener for illustrative purposes only and is not intended to limit the scope of the invention in any way.

Figure 16:
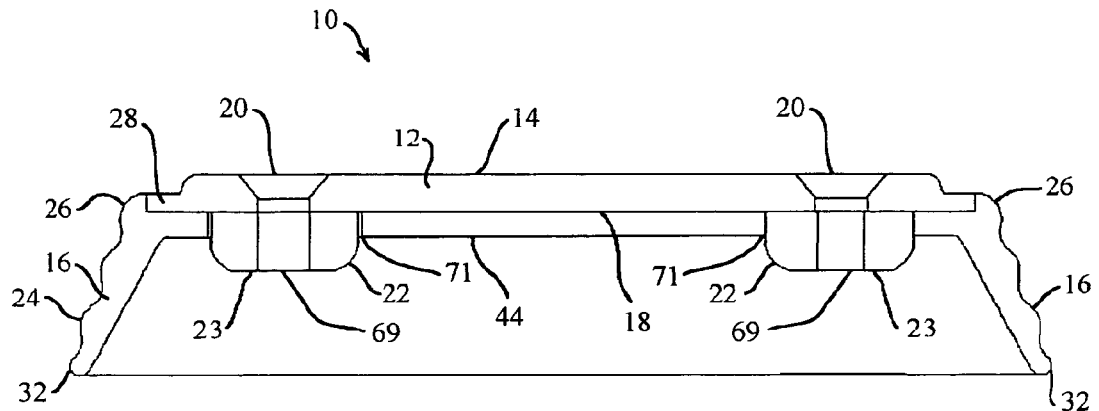
FIGS. 16-19 are side cross-section views of other different alternative embodiments of the self leveling adaptor of the invention.

FIG. 16 illustrates another alternative embodiment of the plate 12 wherein the self leveling adaptor 10 of the invention is configured having the support nipples 22 structured independently of both the plate 12 and the pliable boot 16. Accordingly, the support nipples 22 are each formed with a single fastener hole 69 there through that is matched to the corresponding fastening holes 20. One of the independent support nipples 22 is provided for each of the one or more fastening holes 20, with the single fastener hole 69 substantially aligned with the corresponding fastening hole 20. The independent nipples 22 serve the same function as the integral nipples 22 that are illustrated and described herein. Thus, three of the independent nipples 22 are distributed around the substantially planar mounting surface 14 of the rigid plate 12 to form a plane on substantially any curved or irregular surface S. The independent support nipples 22 substantially rigid to support the plate 12 when fasteners F are used to clamp the plate 12 to the surface S. Accordingly, the independent support nipples 22 are optionally formed of a substantially rigid material such as metal or rigid plastic. As illustrated on the left, the single fastener hole 69 in each of the independent nipples 22 is optionally sized the same or larger than the corresponding fastening hole 20.

Alternatively, the independent support nipples 22 are formed of a minimally pliable material, such as a hard rubber or elastomer, so that the independent support nipples 22 provide some "give" or compress slightly upon being clamped against the surface S by the fasteners F. According to one embodiment of the present invention, as illustrated on the right, when the independent support nipples 22 are formed of a minimally pliable material, the fastener hole 69 are slightly smaller than the corresponding fastening holes 20 so that the fastener F is slightly larger in diameter than the fastener holes 69. Accordingly, the fastener F is actually threaded into the fastener holes 69, with the fastener F self-threading within the fastener holes 69. Thus, the independent support nipples 22 are secured in position adjacent to the plate 12 during installation onto the surface S.

The interior base portion 44 of the cup-shaped boot 16 is optionally formed with apertures 71 that are aligned with the corresponding fastener hole 20 through the plate 12. As illustrated here on the left, the apertures 71 are optionally sized to clear the outside diameter of the independent support nipples 22. Alternatively, as illustrated on the right, the apertures 71 are optionally sized about the same as the outside diameter of the independent support nipples 22, whereby the independent support nipples 22 are secured in position adjacent to the plate 12 during installation onto the surface S.

Figure 17:
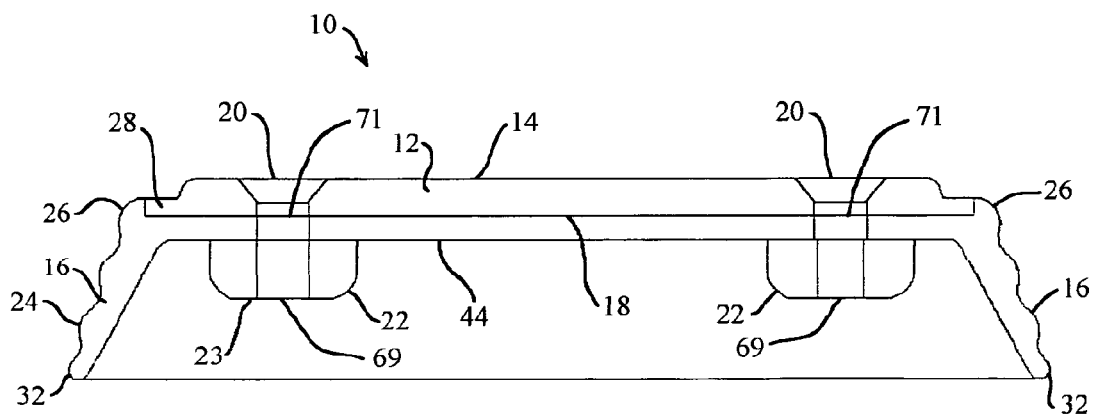

FIG. 17 illustrates another alternative embodiment of the self leveling adaptor 10 of the invention wherein the support nipples 22 are structured independently of both the plate 12 and the pliable boot 16. Here, the apertures 71 that are formed through the interior base portion 44 of the cup-shaped boot 16 and aligned with the corresponding fastener hole 20 through the plate 12 are optionally substantially the same size as the corresponding fastener holes 20 through the plate 12. Accordingly, the independent support nipples 22 are spaced away from the coupling surface 18 of the plate 12 by the thickness of the interior base portion 44 of the boot 16. The interior base portion 44 of the boot 16 is thus captured between the independent support nipples 22 and the plate 12.

As illustrated on the left, the single fastener hole 69 in each of the independent nipples 22 is optionally sized the same or larger than the corresponding fastening hole 20.

As illustrated on the right, the single fastener hole 69 in each of the independent nipples 22 is optionally sized slightly smaller than the corresponding fastening holes 20 so that the fastener F is slightly larger in diameter than the fastener holes 69. Accordingly, the fastener F is actually threaded into the fastener holes 69, with the fastener F self-threading within the fastener holes 69. Thus, the interior base portion 44 of the boot 16 is captured between the independent support nipples 22 and the plate 12 when the independent support nipples 22 are secured to the plate 12 during installation onto the surface S.

Figure 18:
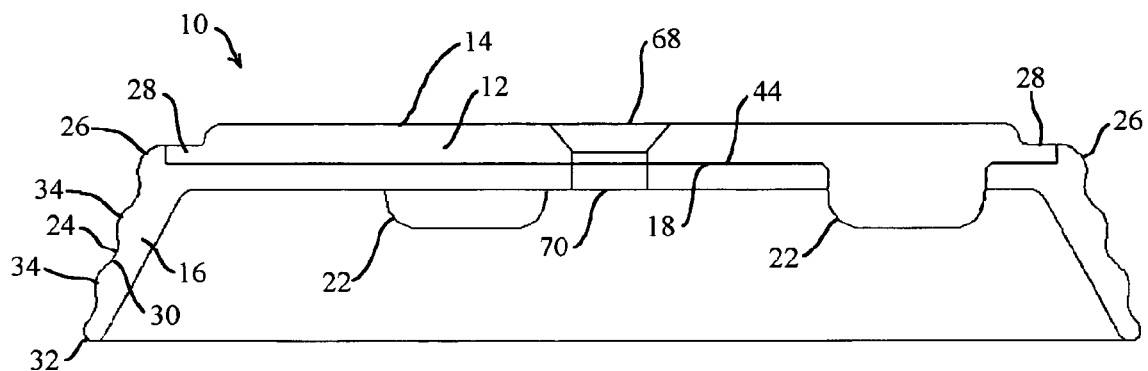

FIG. 18 illustrates another alternative embodiment of the plate 12 wherein the self leveling adaptor 10 of the invention is configured to accept a single one of the discrete fasteners 64 at the center of the mounting surface 14, while the support nipples 22 provide the three-point contact that causes the plate 12 to self-level relative to the external surface S. Accordingly, a single fastening hole 68 is positioned central of the plate 12 and the triangular or circular pattern of support nipples 22 protruding from the coupling surface 18 thereof. By example and without limitation, the central fastener hole 68 is a chamfered, non-tapered, hole through the plate 12. The single central fastener hole 68 is optionally tapered as being formed by an injection molding process. According to one embodiment of the invention, the central fastener hole 68 is optionally formed with the countersink or counter bore portion 66 (shown in previous figures) that is recessed into the mounting surface 14 of the plate 12 to ensure that the mounting surface 14 remains smooth and substantially planar for mounting of an external device thereto. Alternatively, the central fastener hole 68 is threaded (shown in previous figures) to accept a threaded fastening device. The single central fastener hole 68 is optionally either a blind or through hole, either a threaded or non-threaded hole. Additionally, the single central fastener hole 68 is optionally configured as a hole that is threaded with the use of a threaded insert without departing from the spirit and scope of the invention. The interior base portion 44 of the cup-shaped boot 16 is formed with an aperture 70 that is aligned with the corresponding central fastener hole 68 through the plate 12.

Figure 19:
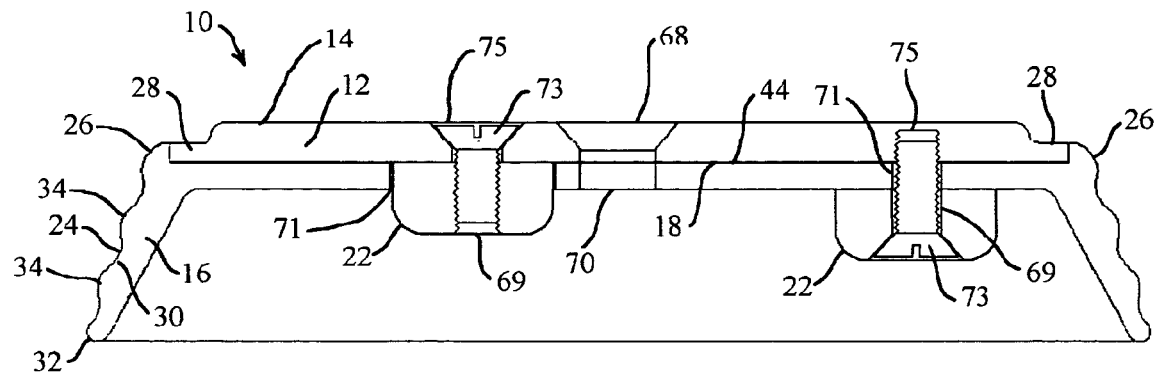

FIG. 19 illustrates another alternative embodiment of the self leveling adaptor 10 of the invention wherein the support nipples 22 are structured independently of both the plate 12 and the pliable boot 16. Here, the independent support nipples 22 are combined with the single fastening hole 68 positioned central of the plate 12. The single fastener holes 69 through each independent support nipples 22 are structured to accept fasteners 73 that secure the independent support nipples 22 to the coupling surface 18 via corresponding fastener holes 75 formed in the plate 12. As illustrated on the left by example and without limitation, the fastener holes 69 are threaded to accept threaded fasteners 73 thereinto. Alternatively, as illustrated on the right by example and without limitation, the fastener holes 69 are provided as clearance holes for the fasteners 73, and the corresponding fastener holes 75 formed in the plate 12 are threaded to accept the threaded fasteners 73 thereinto. The threaded fastener holes 75 formed in the plate 12 are optionally formed either as holes through the plate 12 or as blind holes (shown).

Alternatively, the fastener holes 69 are formed with smooth bores to accept rivet fasteners or threaded fasteners with nuts thereon for securing the independent nipples 22. Other means of securing the independent nipples 22 to the plate 12 are generally well known and such other securing means are similarly considered to be within the scope of the invention.

As discussed above, the interior base portion 44 of the cup-shaped boot 16 is optionally formed with the apertures 71 that are aligned with the corresponding fastener hole 20 through the plate 12. As illustrated here on the left, the apertures 71 are optionally sized to clear the outside diameter of the independent support nipples 22. Alternatively, as illustrated on the right, the apertures 71 are optionally sized about the same as the outside diameter of the independent support nipples 22, whereby the independent support nipples 22 are secured in position adjacent to the plate 12 during installation onto the surface S.

As illustrated here, the three support nipples 22, whether integral or independent of the plate 12 or boot 16, are optionally formed having one or more different lengths.

Figure 20:
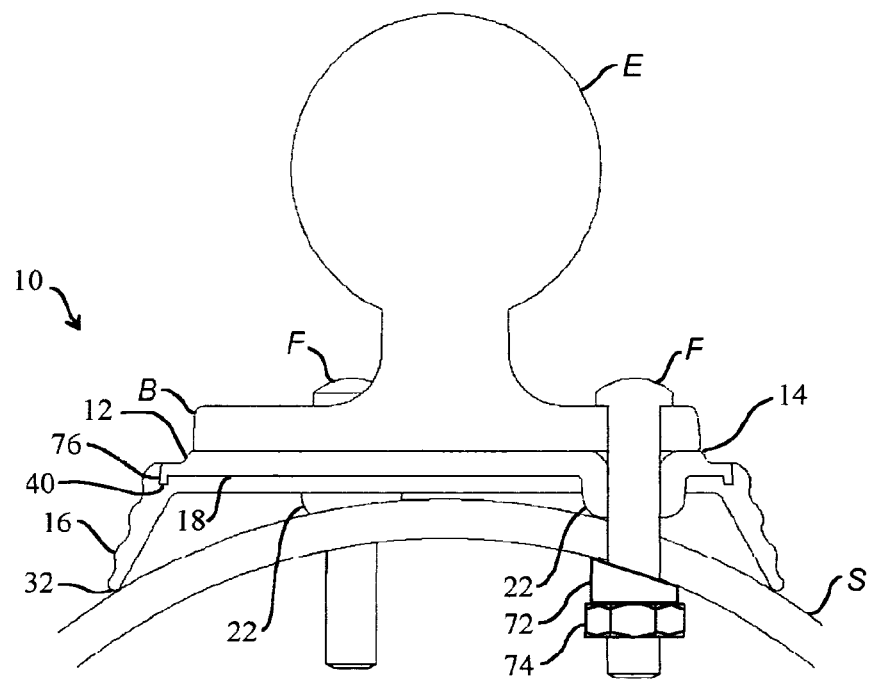
FIG. 20 is another side cross-section view of a self leveling adaptor of the invention.

FIG. 20 illustrates the smooth flow of the skirt 24 around the self leveling adaptor 10 between the plate 12 and the external surface S, even when the external surface S is curved or otherwise irregular in contour. An optional bevel washer 72 is provided for mounting the leveling adaptor 10 of the invention. The optional bevel washer 72 is a discrete device that may be used to provide a substantially level surface opposite the mounting surface S of the leveling adaptor 10 if the external surface opposite the mounting surface is curved. A separate nut or other retaining device 74 is coupled to the discrete fastener 64 for fastening and retaining the self leveling adaptor 10 relative to the surface S. The threaded fastener 64, optional bevel washer 72 and separate retaining device 74 are intended for illustrative purposes only and are not intended limit the scope of the invention in any way.

Also illustrated is an alternative configuration of the peripheral lip 28 wherein the peripheral lip 28 includes a substantially right-angled ridge 76 with the seat 40 forming a bottom or under surface thereof, whereby the peripheral lip seat 40 resides below and non-coplanar with the substantially planar coupling surface 18 of the plate 12. The alternative configuration of the peripheral lip 28 as described here is merely descriptive and is not intended to limit the scope of the invention in any way.

Figure 21:
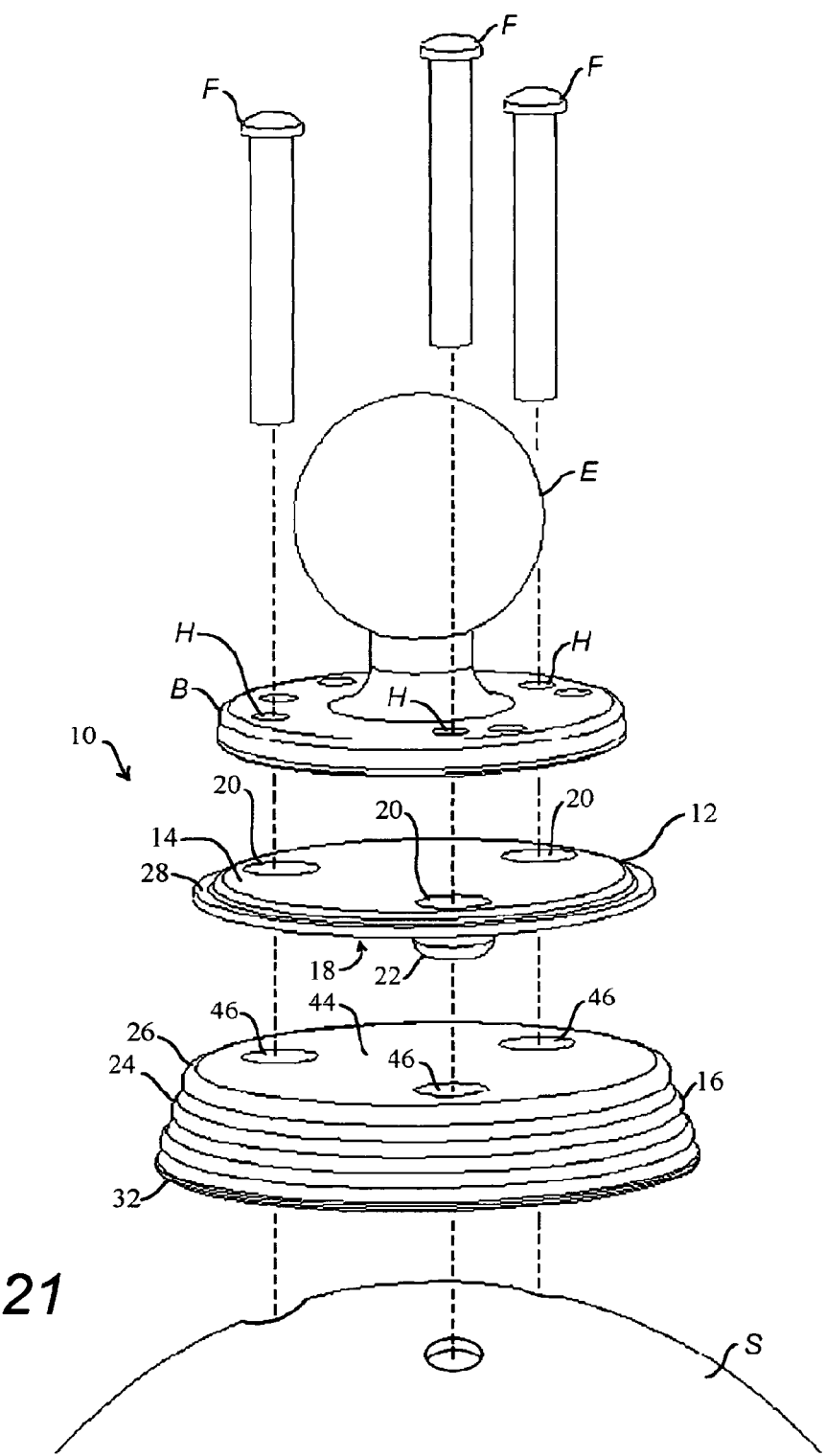
FIG. 21 is an exploded assembly view of a self leveling adaptor of the invention.

FIG. 21 illustrates assembly of the self leveling adaptor 10 of the invention, including assembly of the pliable boot 16 to the coupling surface 18 of the rigid plate 12 with the nipple apertures 46 fitting over the support nipples 22. Installation of the self leveling adaptor 10 on the curved or otherwise irregular external surface S provides a planar and level mounting surface 14 for an external device E having a substantially planar mounting base B, by example and without limitation, a coupler of the type described in U.S. Pat. No. 5,845,885.

The fasteners F operate through three fastening holes 20 to secure both the self leveling adaptor 10 and the external device E to the curved or otherwise irregular external surface S. The three support nipples 22 of the self leveling adaptor 10 level the substantially planar mounting surface 14 and secure the rigid plate 12 from rocking on the non-flat surface S. The pliable boot 16 fills the space left between the coupling surface 18 of the rigid plate 12 and the external surface S while its hem 32 substantially conforms to the curved or otherwise irregular external surface S.

While the preferred embodiment of the invention has been illustrated and described, it will be appreciated that various changes can be made therein without departing from the spirit and scope of the invention. For example, the support nipples 22 are alternatively any length so that the plate 12 is spaced any desired distance from the surface S. Additionally, the three different support nipples 22 are alternatively of various different lengths so that, for example, the mounting surface 14 is made substantially horizontal when the self leveling adaptor 10 of the invention is secured to an inherently non-horizontal surface S. Furthermore, the skirt portion 24 of the pliable boot 16 is optionally made any desired length to fill any desired distance between the plate 12 and the surface S. Therefore, the inventor makes the following claims.

What is claimed is:

1. A self leveling adaptor, comprising:
    a rigid plate that is structured with opposing and spaced apart mounting and coupling surfaces and a peripheral lip, the plate being structured with one or more fastener apertures between the mounting and coupling surfaces;
    a triangular arrangement of three nipples positioned adjacent to the coupling surface of the rigid plate, each nipple having a first end adjacent to the coupling surface and a contact surface at a second distal end thereof spaced away from the coupling surface; and
    a pliable boot structured for being coupled between the plate coupling surface and an external surface, the boot further comprising a waist portion that is structured to couple the boot to the peripheral lip of the plate, and a pliable skirt portion extended from the waist portion to a hem portion distal of the plate with the skirt portion forming a hollow cavity surrounding the three nipples and the hem portion extended beyond the second distal ends thereof.

2. The adaptor of claim 1 wherein each of the nipples further comprises one of the fastener apertures formed there through.

3. The adaptor of claim 1 wherein the hem portion of the pliable skirt of the boot further comprises a conformable hem portion.

4. The adaptor of claim 3, further comprising an adhesion between the boot portion and the coupling surface of the plate.

5. The adaptor of claim 3 wherein the nipples are integral with the plate and project from the coupling surface thereof; and
    the interior base portion of the boot further comprises an aperture there through in alignment with each of the nipples.

6. The adaptor of claim 3 wherein the nipples are structured independently of both the rigid plate and the pliable boot.

7. A self leveling adaptor, comprising:
    a rigid plate that is structured with opposing and spaced apart substantially planar mounting and coupling surfaces, wherein the plate is substantially round and further comprises a peripheral lip;
    three fastener apertures formed through the plate between the mounting and coupling surfaces;
    three nipples projected from the plate coupling surface, one of the nipples being substantially aligned with each of the fastener apertures; and
    a pliable cup-shaped boot structured with a skirt portion with a waist portion surrounding an interior base portion, the interior base portion being structured with three apertures, one of the apertures being substantially aligned with and surrounding each of the nipples on the plate coupling surface, and wherein the pliable boot further comprises pliable skirt portion extended from the waist portion to a hem portion distal of the base portion thereof with the skirt portion forming a hollow cavity surrounding the three nipples and the hem portion extended beyond distal ends thereof spaced away from the coupling surface of the plate.

8. The adaptor of claim 7 wherein the waist portion of the boot is further structured for coupling the boot to the peripheral lip of the plate.

9. The adaptor of claim 7 wherein the interior base portion of the boot is further coupled to the coupling surface of the plate.

10. The adaptor of claim 7, further comprising a vulcanizate bond between the interior base portion of the boot and the coupling surface of the plate.

11. The adaptor of claim 7 wherein the three fastener apertures are further arranged in a substantially equilateral triangle pattern.

12. The adaptor of claim 7 wherein the skirt portion further comprises a flared skirt with a generally tapering thickness.

13. A self leveling adaptor, comprising:
    a substantially round rigid plate that is structured with opposing and spaced apart substantially planar mounting and coupling surfaces and a peripheral lip portion formed there between;
    three integral nipples arranged in a triangle and projected from the coupling surface of the plate, each of the nipples being formed with a contact surface distal from the plate coupling surface;
    a fastener aperture formed through the plate between the mounting surface and the nipple contact surface; and
    a pliable cup-shaped boot structured with a flared skirt portion and having an integral waist portion surrounding an integral interior base portion, the inner base portion being structured with three apertures, the apertures being structured to substantially align with the nipples, and the skirt portion further forming a hollow cavity surrounding the three nipples and further comprising a hem portion distal of the interior base portion of the boot with the hem portion extended beyond distal ends of the three nipples spaced away from the coupling surface of the plate.

14. The adaptor of claim 13 wherein the waist portion of the boot is further structured to couple with the peripheral lip portion of the plate.

15. The adaptor of claim 13 wherein the flared skirt portion of the boot is further structured with a generally tapering thickness between the hem portion and the waist portion.

16. The adaptor of claim 13 wherein the inner base portion of the boot is substantially permanently attached to the coupling surface of the plate.

17. The adaptor of claim 13 wherein the three nipples are further arranged in a substantially equilateral triangle.

* * * * *